United States Patent
Ammatuna

[15] 3,653,780
[45] Apr. 4, 1972

[54] TAPPING TOOL

[72] Inventor: Salvatore Ammatuna, 2859 Regnart Way, Santa Clara, Calif. 95051

[22] Filed: Dec. 10, 1969

[21] Appl. No.: 883,813

[52] U.S. Cl. .................................. 408/241, 10/129, 82/33
[51] Int. Cl. ..................... B23g 1/00, B23g 1/48, B23b 23/04
[58] Field of Search .................... 10/129, 147, 149, 151; 77/55 G; 82/33, 33 A; 408/241

[56] References Cited

UNITED STATES PATENTS

| | | | |
|---|---|---|---|
| 1,898,285 | 2/1933 | Blauvelt | 77/55 G |
| 2,286,088 | 6/1942 | Harrell | 82/33 |
| 3,456,534 | 7/1969 | Williams | 82/33 |

Primary Examiner—Charles W. Lanham
Assistant Examiner—E. M. Combs
Attorney—Boyken, Mohler, Foster & Schwab

[57] ABSTRACT

A manually actuatable tapping tool for use with a conventional threading tap, polysided at one end for a common hand stock having the usual conical sided recess or point on the axially facing surface of said end, said tool having a tubular sleeve for clamping within a chuck on a milling machine, drill press, lathe, and the like. A spindle reciprocable within said sleeve has a projecting end complementarily formed relative to said recess or point for engagement therewith for holding and aligning said tap and spindle, and a compressible spring around said spindle reacts between a radial projection on said tap and said sleeve to yieldably maintain said alignment and the engagement between said tap and spindle, when said sleeve is clamped within said chuck and the cutting end of the tap is in a hole to be threaded and when said spring is compressed.

1 Claims, 5 Drawing Figures

PATENTED APR 4 1972 3,653,780
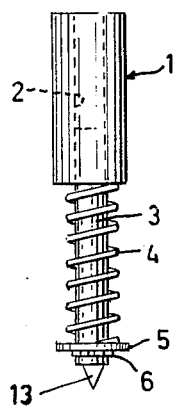
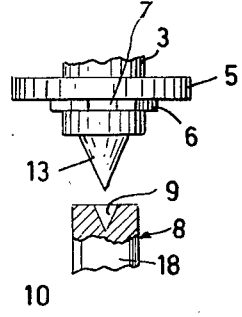
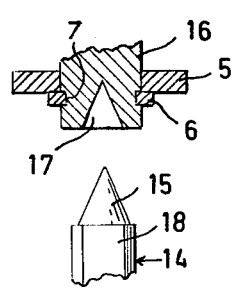
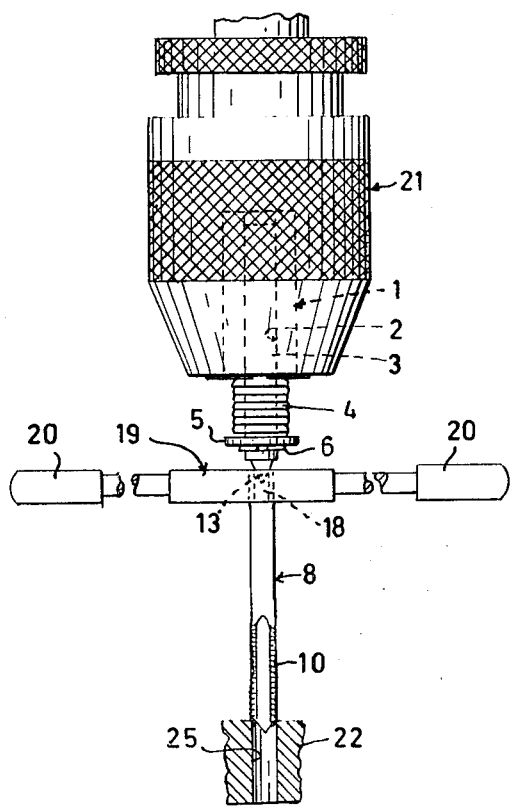
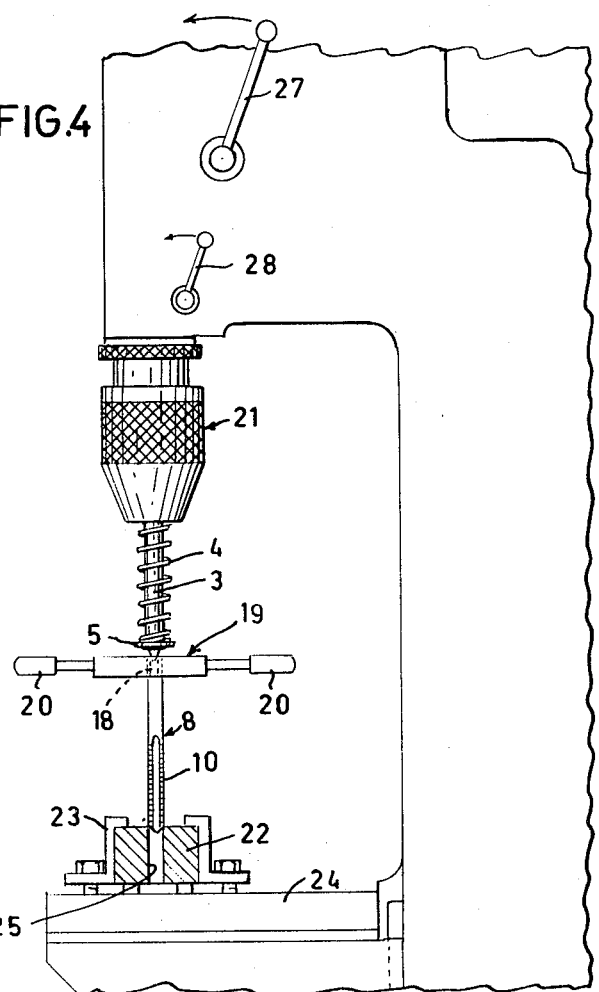
INVENTOR.
SALVATORE AMMATUNA
BY
Boykin, Mohler, Foster & Regan
ATTORNEYS

TAPPING TOOL

SUMMARY OF THE INVENTION

The present tool is specifically designed for manual, high precision tapping of drilled holes and recesses with conventional taps of from 2/56 inch size and up that have a polysided end portion for the usual stock for manually rotating the tap. Conventional taps are of two types, one being formed with a conical axially outwardly projecting point, and the other being the reverse, or formed with a conical sided recess. These points or recesses provided centers for holding the taps at one of their ends during their fabrication, hence they are each precisely positioned on the longitudinal axis of each tap.

Heretofore the breakage of taps, and particularly relatively small taps, has been frequent in power-driven machines as well as where manually actuated stocks have been used to rotate the taps. Such breakage may be due to lack of accurate alignment of the tap with the hole or recess during rotation of the tap, or sudden or excessive torque applied to the tap, either through the operator being unable to sense the resistance to turning the tap, or the sudden resistance encountered due to accumulation of chips in the bottom of the recess being tapped.

Efforts to eliminate such breakage have been in the form of relatively complicated and expensive tools or machines providing special locking pins, special tap holding chucks and turning wheels engaging the chucks, and special adapters for different sizes of taps. In certain instances a starting spring has been provided for transmitting a yieldable force to the tap through the special chuck for the tap, to effect starting the tap only.

Several objects of the invention are the provision of a tapping tool adapted to be used with equal facility in a milling machine, drill press, lathe and the like and that requires far fewer parts than prior devices; that is more economical to make and more accurate in use than heretofore; that requires no chucks apart from the standard chucks provided for conventional millers, drill presses or lathes for holding drills; and that may be used on taps of all sizes without requiring special adapters; and which tool is of an axial length that enables it to readily replace the drill that may have been used to drill the hold or recess to be threaded without moving or dislodging the work in which the hole or recess was drilled, thus insuring against misalignment of the tap with the hole due to the necessity for shifting the work to replace the drill with the tap.

Other objects and advantages will appear in the description and in the drawings.

DESCRIPTION OF THE DRAWINGS

FIG. 1 is an assembled, side-elevational view of the tapping tool apart from the work to be tapped and apart from a miller, drill press or lathe.

FIG. 2 is an enlarged fragmentary, side-elevational view of the lower tap-engaging end of the tool spindle spaced above the upper end of a conventional tap, shown in cross section, of the type having a recess formed in its upper end.

FIG. 3 is an enlarged, fragmentary, cross-sectional view of the lower tap-engaging end of a tool spindle, shown in cross section, corresponding to the lower end of the spindle shown in FIG. 2 except that it is formed with a recess to receive the pointed upper end of the type of tap having a point on its upper end, the upper pointed end of such tap being shown in elevation below said spindle.

FIG. 4 is a reduced size view of the tool in position in a highly simplified machine that is illustrative of its use in a milling machine, drill press or lathe, the machine being disproportionate in size to the tool to accommodate the view to the sheet.

FIG. 5 is an enlarged view of the tool shown in FIG. 4 including only the chuck of the machine and the work to be tapped, and with the spring of FIG. 4 compressed preparatory to manual turning of the tap.

DETAILED DESCRIPTION

The tool comprises three main parts, namely, a cylinder or sleeve 1 having a central open ended bore 2 for a spindle 3 reciprocably slidable in said bore, and a coil or helical compressible spring 4 through which the spindle 3 extends.

The bore in cylinder 1 and the cylindrical outer surface of the cylinder 3 should be accurately concentric and the outer cylindrical surface of the spindle should accurately fit within the bore 2 of the cylinder 3 for free reciprocable movement of the spindle within said bore, but without lateral looseness.

The tool will be described as being vertical inasmuch as the drawings show it in that position, it being understood, however, that its use is not restricted to that position, as will later appear.

The lower end portion of the spindle 3 is provided with a radially outwardly extending projection 5 and the coil spring 4 reacts between said projection 5 and the lower end of the sleeve 1 when the sleeve and spindle are vertical.

A snap ring 6 may be releasably secured in an annular radially outwardly opening groove 7 (FIG. 2) adjacent to the lower end of the tool. The outward projection 5 is shown as an annular washer supported against the snap ring against movement of the washer past the ring toward the pointed end of the spindle. The projection 5 could be integral with the spindle if desired.

One type of a conventional tap, generally designated 8, for manual tapping is formed with a central, conical, axially outwardly opening recess 9 in the end opposite to the thread cutters 10. For this type of tap, the lower terminal end of spindle 3 is formed with an axially outwardly projecting point 13 (FIGS. 1, 2) that is complimentary to recess 9.

The other type of tap, generally designated 14 (FIG. 3) is formed with a point 15 on the terminal end that is opposite to the thread cutters (FIG. 3) that is similar to the point 13. In this case the terminal end of the spindle, designated 16, is formed with an axially outwardly opening conical sided recess 17.

In the two types of taps described, the pointed end or the recessed end provided structure for engagement with a centering tool during fabrication of each tap, hence the conical sided recess 9 and the point 13 are exactly on the central longitudinal axes of the taps. Otherwise the two types of taps are identical, each having a polysided end portion 18 opposite to the thread cutters for releasable engagement in the usual manner within the conventional stock 19 having oppositely outwardly extending handles 20 for rotating the tap.

The tubular cylinder or sleeve 1 is of an outside diameter for securement within the conventional JACOBS or ALBRECHT chuck 21 on a milling machine, drill press or tailstock on a lathe, or within the appropriate sized collet on a milling machine if a collet is substituted for the chuck. The word "chuck" used herein is intended to include a collet. In any event, the length of the sleeve is preferably such that it may be received within the jaws of the chuck for substantially its entire length, thereby reducing the length of the tool between the chuck and the work to be threaded by the length of the cylinder 1.

In actual practice, by way of example, a sleeve approximately 1 inch in length and having an outside diameter of approximately one-half inch and a bore of one-quarter of an inch has been found to be generally satisfactory, although it is to be understood that the invention is not to be limited to said dimensions In a normal operation, the work 22 (FIGS. 4, 5) to be threaded is rigidly clamped by conventional or any suitable means such as clamps 23 on a support 24 which is the bed of a milling machine, drill press, or on the head stock of a lathe, in a position for drilling a hole or recess 25 at the desired location therein by a drill in chuck 21. The support 24 may be the bed itself, or a member secured on the bed, it being immaterial as long as the work is held rigid against lateral movement during the drilling and tapping operation.

In each of the machines described, the chuck may be operatively connected with a motor (not shown) for rotating it for actuating the drill for forming the hole or recess to be threaded. Whether the chuck is rotatable during the threading operation is immaterial.

The chuck 21 is lowered by swinging the lever 27 on the machine 28 forwardly in the direction of the arrow (FIG. 4) and the spindle is locked against axial movement at any point in its downward movement by actuation of the locking arm 28, and in some instances the bed carrying the work may be raised or lowered and locked in adjusted position.

In a drill press a similar arrangement is provided, and in a lathe the work may be held by a work-holding clamp or check on the tailstock, and the drill or tap by a chuck on a non-rotating spindle on the tail stock, with control elements the equivalent of the arms or levers 27, 28 for moving the drill or tap toward the work, and for locking it stationary at any point during such movement. These features are well known to those skilled in the art. After the work 22 is held rigid on the support 24 and the hole or recess 25 has been drilled, the drill may be quickly removed from the chuck 21 and is replaced by the cylinder or sleeve 1.

The sleeve 3 is positioned in bore 2, with spring 4 between the end of the cylinder 3 that is exposed at the chuck 21 and the tap 8, with the stock 19 thereon positioned between the spindle 3 and the work 22 and with the lower end of the tap in the upper end of hole or recess 25 and the spindle 3 and tap 8 in axial alignment.

The foregoing steps may readily be performed without moving the work 22 or the chuck 21 after the drill used to form the hole or recess 23 has been removed.

The chuck 21 is then lowered by actuation of handle or arm 27 until the spring 4 is fully compressed, and then the spindle 21 is locked against reciprocable movement. The tapered outer end of the tap that is in the upper end of the hole or recess 25 and the complementarily formed conical surfaces on the engaging ends of the spindle 3, and the upper end of the tap will hold the tap in perfect alignment.

The operator will then rotate the tap by handles 20 and the thread cutters 10 will cut the threads in the sides of the hole or recess, the tap and spindle 3 continuing to be held in said perfect alignment by the spring 4, only under a progressively diminishing axially applied force, until the threads are cut to the desired distance. Once the threads in the work have started, the continued cutting thereof will be automatic, but the tap must continue to be held in axial alignment with the hole 25 and spindle during the remainder of the cutting. As long as yieldable force is applied by the spring 4, the tap will be held in axial alignment with the hole and spindle.

The tap can readily be retracted from the hole at any time to clear it of chips, if this is necessary, without altering the axial alignment of the chuck with the work.

From the foregoing description it is apparent that the spindle 16 would operate in exactly the same was as spindle 3 if the tap has a pointed upper end instead of a recessed upper end.

By the structure of the tool and its use, as hereinbefore described, it is apparent that the axial alignment of the tap relative to the hole and the spindle 3 and chuck 21 is such that breakage of the smallest tap due to misalignment is virtually impossible. Approximately the entire length of the spindle 3 is accurately and positively supported and guided within bore 2 during the initial movement of the tap in a cutting operation and approximately a third of it is in the bore when the tap has moved into the hole 25 for substantially the entire length of the rows of thread cutters, and during all this time a progressively lessening yieldable pressure maintains the alignment as the length of the thread that is cut increases.

The invention, insofar as the tapping tool itself is concerned may be characterized as being a manually actuatable tool for use in a conventional machine for drilling, whether it is a milling machine, drill press, lathe, or the like. Each has a drill-holding chuck and a work-holding member spaced axially from the chuck for holding the work that has the opening to be threaded. A conventional thread cutting tap of the type having a terminal conical end surface coaxial therewith, opposite its cutting end with a polysided end portion adjacent said end surface having a conventional manually actuatable hand stock in releasable engagement therewith, is used.

The tool for use in the above-described conventional machine may be broadly summarized as being a tubular elongated sleeve 1 for gripping within a drill-holding chuck 21, having a central bore 2 therein and an elongated spindle 3 slidably fitted within said bore for reciprocable movement longitudinally thereof having a projecting end portion projecting from one end thereof, and outwardly of the chuck when the sleeve is gripped within the latter.

The spindle has tap-engaging means 13 or 16 formed on the axially facing terminal end of the projecting end portion thereof that is complementary to the terminal conical end surface 9 or 15, on the tap for engagement therewith when said tap is coaxial with said sleeve, and when said hand stock is on said polysided end portion of said tap.

A compressible coil spring 4 around the projecting end of the spindle will react between the radially outwardly projecting element 5 on said spindle and the end of sleeve 1 to yieldably hole the spindle and tap in axial alignment and wild yieldably maintain the tap against the work 22 and in hole 25 during manual rotation of the hand stock 19 when the tap is in engagement with said work for cutting a thread in hole 25 and when the chuck 21 is in a position holding said spring compressed between the sleeve 2 and element 5.

As a method, the operation itself comprises the steps of supporting the ordinary combination of a tap and manually actuatable hand stock thereon in a thread cutting position coaxial with the hole to be threaded applying a yieldable pressure against said tap axially thereof toward said hole during manual rotation of said hand-stock and axial movement of said tap during cutting of said threads, which pressure is progressively reduced in direct proportion to the axial movement of said tap.

I claim:

1. A manually actuatable tapping tool for use in a conventional machine for drilling such as a miller, drill press, lathe, and the like having a conventional drill-holding chuck including a work-holding member spaced axially therefrom, with a conventional elongated thread cutting tap having a terminal conical end surface coaxial therewith opposite its cutting end and a polysided end portion adjacent said end surface with a conventional manually actuatable hand stock in releasable engagement therewith, consisting of:

a. an elongated one piece cylindrical sleeve having a free inner terminal end and a free outer terminal end and a central cylindrical bore within said sleeve opening outwardly of said sleeve at said terminal ends, the outside diameter of said sleeve being uniform from end to end thereof, and the length of said sleeve adapting it to be enclosed by and secured within a conventional JACOBS or ALBRECHT chuck and the like with said other free terminal end at the outer end of such chuck, b. an elongated, solid, cylindrical spindle one terminal end being formed with a conical surface coaxial with said spindle complementary to the conical end surface on the shank of a threading tap for engagement with said end of said tap for centering such tap coaxial with and in longitudinal alignment with such spindle when such hand stock is on said polysided end portion preparatory to cutting a thread, c. a radially outwardly projecting element on said spindle closely adjacent to said one terminal end thereof, and the portion of said spindle between said element and the other terminal end of said spindle opposite to said one terminal end being of uniform diameter approximately that of the inside diameter of said bore for slidably fitting within said bore for reciprocable movement relative to said bore longitudinally of the latter, and whereby said portion may be quickly withdrawn from said bore and replaced by a spindle having a corresponding portion without removing said sleeve from a chuck enclosing and holding said sleeve, d. a coil spring outwardly of said one outer free terminal end of said sleeve between said last mentioned end and said element and in engagement therewith when the end portion of said spindle at said other terminal end is positioned within said bore, and said sleeve is held within said chuck with the outer thread cutting end of the tap supported by the stationarily held work to be threaded, e. said spring being compressible between said element and said terminal outer free end of said sleeve upon moving said chuck and the sleeve held thereon toward such stationarily held work when said tap is held by said spindle between said work and said spindle and said spindle extends into said bore, whereby said tap will be yieldably urged toward said stationarily held work during a tapping operation upon rotating said tap by said hand stock.

* * * * *